United States Patent [19]

Makris

[11] Patent Number: 4,923,224

[45] Date of Patent: May 8, 1990

[54] COUPLING DEVICE FOR HIGH PRESSURE HOSES

[76] Inventor: Anthony E. Makris, 664 Devitt Ave., Campbell, Ohio 44405

[21] Appl. No.: 364,818

[22] Filed: Jun. 12, 1989

[51] Int. Cl.$^5$ ............................................. F16L 25/00
[52] U.S. Cl. ................................. 285/177; 285/239; 285/354; 285/404
[58] Field of Search ............... 285/177, 354, 353, 237, 285/371, 239, 404

[56] References Cited

U.S. PATENT DOCUMENTS

| | | | |
|---|---|---|---|
| Re. 29,376 | 8/1977 | Hiszpanski | 285/169 |
| 162,506 | 4/1875 | Summers . | |
| 188,213 | 3/1877 | Weiss . | |
| 219,032 | 8/1879 | Stewart . | |
| 675,335 | 5/1901 | Luke . | |
| 839,090 | 12/1906 | Ayer | 285/354 X |
| 974,975 | 11/1910 | Kelly . | |
| 1,069,916 | 8/1913 | Windsor . | |
| 1,222,088 | 4/1917 | Evans, Sr. . | |
| 1,232,129 | 7/1917 | Wafer . | |
| 1,455,971 | 5/1923 | Rickenbacker et al. . | |
| 1,509,484 | 9/1924 | Powell . | |
| 1,522,999 | 1/1925 | Campbell . | |
| 1,665,812 | 4/1928 | Jones . | |
| 2,210,340 | 8/1940 | Reinhardt | 285/128 |
| 2,503,826 | 4/1950 | Lamont | 285/126 |
| 2,591,326 | 4/1952 | Williams | 285/86 |
| 2,691,536 | 10/1954 | Tamminga | 285/354 |
| 3,955,835 | 5/1976 | Farrington | 285/175 |
| 4,666,188 | 5/1987 | Hockett | 285/915 X |
| 4,844,516 | 7/1989 | Baker | 285/371 X |

FOREIGN PATENT DOCUMENTS

| | | | |
|---|---|---|---|
| 6002 | 3/1933 | Australia | 285/354 |
| 556079 | 2/1960 | Belgium | 285/177 |

OTHER PUBLICATIONS

Advertising copy, Clemco, 2 pages.

Primary Examiner—Dave W. Arola
Attorney, Agent, or Firm—Renner, Kenner, Greive, Bobak, Taylor & Weber

[57] ABSTRACT

A coupling (10) for hoses (11a and 11b) having a first and a second body section (12 and 13 respectively). Each body section (12, 13) has a bore thereof (14 and 15 respectively) such that the bores will accept hoses (11a and 11b, respectively). An engaging assembly (24) is provided to sealingly engage the body sections (12, 13) in juxtaposition. The engaging assembly (24) includes a series of sealing surface engagements between the first and second body sections (12, 13). Further, sealing engagements are made between the hoses (11a, 11b) and abutting surface (40, 42) of the first body section (12). A locking assembly is provided to securely and removably attach the two body sections (12, 13) together, and includes nut a (44) which threadably engages first body section (12) and abuttingly engages shoulder (46) of the second body section (13).

15 Claims, 2 Drawing Sheets

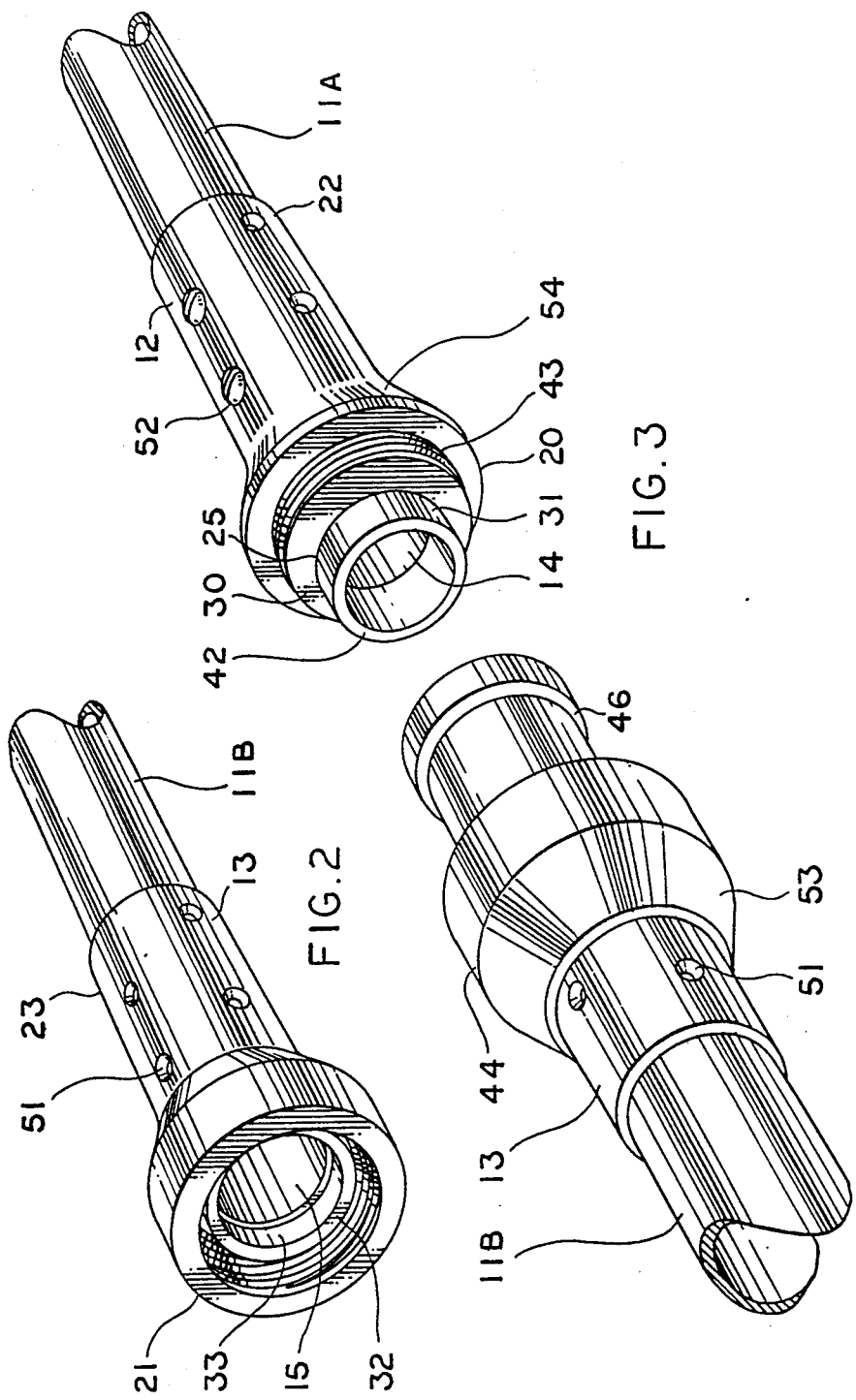

COUPLING DEVICE FOR HIGH PRESSURE HOSES

TECHNICAL FIELD

This invention relates generally to couplings for joining together lengths of hose. More particularly, this invention relates to couplings for joining together lengths of hose wherein the hose is to be used in high pressure operations such as in sand blasting. Specifically, the present invention relates to a coupling which maintains sealing integrity between the lengths of hose without the use of flexible sealing membranes.

BACKGROUND ART

Numerous devices for coupling hoses are known in the art. In many operations, varying lengths of hose are required, and it is necessary to adjust the hose length in order to accomplish the task at hand. Hose segments of the same or differing lengths may be fitted together in order to create one hose having the desired length for any particular job or location.

It is also a common practice to couple hoses of decreasing diameter in order to increase the flow rate of the liquids or gases passing through the hoses, by creating a venturi effect. Often these flows will be under high pressure and will have entrained particulate matter therein.

Coupling devices must maintain an effective seal between the hoses to be coupled, in order to prevent leaking. It is a common practice to have two interconnecting sections, each mounted on one end of separate hoses. The two sections are then connected together, and a seal is created between the sections. Conventionally, a grommet or washer is employed to effect the seal.

Hoses employed in high pressure operations, such as those encountered in sand blasting, present a unique set of special concerns which must be considered. Because of the increased dynamic forces upon the hoses and the attendant couplings in such operations, seal integrity is of utmost importance. A high velocity stream of particulate matter can cause severe damage and injury if not contained.

It has been found, that when couplings are provided with rubber or polymeric grommets and washers, the seal is maintained only as long as these components remain essentially intact. High velocity, particulate matter streams tend to cause degradation of washers after short operating time. The washers known to applicant have projecting edges, which when subjected to a particulate matter flow, are easily damaged.

Even slight degradation of a washer may lead to seal failure, especially given the dynamics of the forces in a high pressure operation. Seal failure will permit the contained stream to escape, often at even a higher flow rate than had occurred within the hose, due to an induced, quasi-venturi effect. Such an escape may cause, and has been known to cause, severe injury and damage to proximate persons and objects.

Therefore, a need exists for a hose coupling, and specifically for a coupling for hoses used in high pressure operations, which maintains seal integrity despite wear tendencies caused by the flowing stream.

DISCLOSURE OF THE INVENTION

It is therefore, an object of the present invention, to provide an improved coupling for hoses.

It is a further object of the present invention, to provide a coupling for hoses used in high pressure applications which will maintain seal integrity despite wear tendencies produced by the contained stream.

It is another object of the present invention, to provide a coupling for hoses which maintains sealing integrity without the use of washers or grommets.

It is yet another object of the invention to provide a coupling for hoses wherein sealing contact is provided by a plurality of abutting surfaces.

It is another object of the invention to provide a coupling for hoses wherein the extremities of the hoses engage abutting surfaces of the coupling.

It is a further object of the invention to provide a coupling for hoses wherein the arrangement of the hoses and coupling is such that the leading edges or extremities of the hoses do not receive direct fluid impingement from the flow of the fluid therein.

It is a still further object of the present invention, to provide a coupling for hoses which may be employed to couple together hoses having varying diameters.

These and other objects of the invention, as well as the advantages thereof over existing and prior art forms, which will become apparent in view of the following specification are accomplished by means hereinafter described and claimed.

In general, a device for coupling hoses in juxtaposition has two engageable body sections, each of which has a bore therein, such that the end of a hose may be fitted inside. The body sections are provided with an engaging assembly, which includes abutting surfaces on each body section. The abutting surfaces engage in sealing contact to form an air tight seal. The first body section has a sealing ring extending into the bore thereof, and also extending into the bore of the second body section. The sealing ring extends into each bore to a distance sufficient to sealingly engage the hoses in each body section bore. A locking assembly is provided to securely attach the two body sections in juxtaposition.

BRIEF DESCRIPTION OF THE DRAWINGS

FIG. 2 is a perspective view of one section of the coupling of FIG. 1.

FIG. 3 is a further perspective view of the coupling of FIG. 1, depicting the two sections separated.

PREFERRED EMBODIMENT FOR CARRYING OUT THE INVENTION

Figure 1:
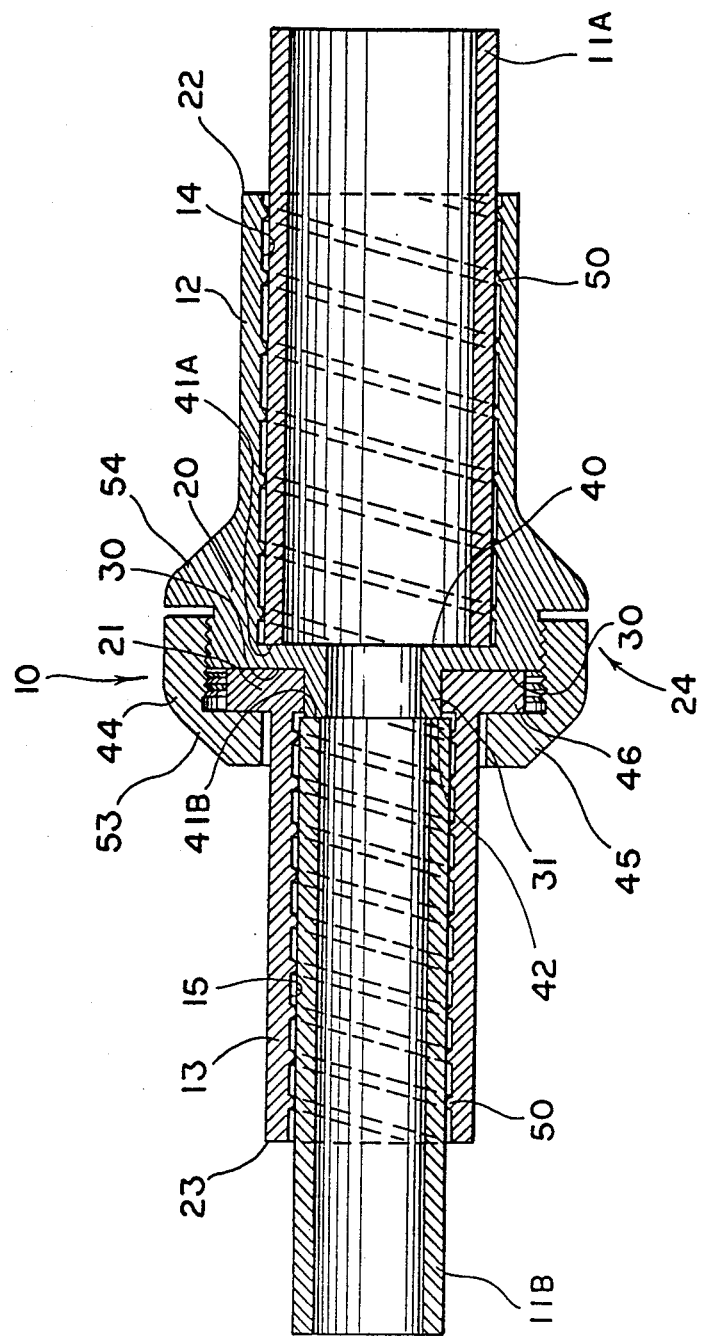
FIG. 1 is a cross sectional side elevational view of a coupling for hoses embodying the concepts of the present invention with the two sections joined.

A coupler for hoses according to the concept of the present invention is indicated generally by the numeral 10 in FIG. 1 of the attached drawings. The coupler 10 is used to sealingly hold together the ends of two different hoses 11a and 11b. While it is envisioned that the present invention has particular application to high pressure operations such as sand blasting, it has equal application to any operation where an air or liquid tight seal between hose sections is required. Further, one skilled in the art will appreciate that the present invention has equal application to hoses carrying liquids or gases, with or without entrained particulate matter. For simplicity of the present disclosure and claims, all such streams shall be collectively referred to by such terms as stream, flow or the like.

The coupler 10 has a first body section generally indicated by the numeral 12 and a second body section generally indicated by the numeral 13. The two sections join together at a point of engagement therebetween, and are in juxtaposition when so engaged, as seen in FIG. 1 of the drawings. It is envisioned that the body sections 12 and 13 may be fabricated from a variety of metallic or polymeric materials. Further, one skilled in the art will appreciate that the two body sections 12 and 13 may be made of the same material, or each may be of a different material than the other.

The two body sections 12 and 13 have cylindrical bores 14 and 15, respectively, lengthwise thereof, wherein the ends of hoses 11a and 11b, respectively, may be fitted. Thus, it is to be appreciated, that when the two body sections 12 and 13 are engaged in juxtaposition, the hoses inside the bores 14 and 15 are also held in juxtaposition, or approximately end-to-end.

The two body sections 12 and 13 have ends 20 and 21, respectively, proximal to the point of engagement, and ends 22 and 23, respectively, distal to the same point. An engaging assembly, generally indicated by the numeral 24 in the attached drawings, is provided at proximal ends 20 and 21, and includes a seal ring 25 integrally formed with the first body section 12, and extending circumferentially around and toward the axial center of first body section bore 14.

Seal ring 25 has a radial abutting surface 30 and an axial abutting surface 31. Abutting surfaces 30 and 31 are depicted in the drawing as having substantially a ninety degree angle between them. However, it is to be understood that this angle may vary considerably without departing from the spirit of the present invention. Further, abutting surface 30 of seal ring 25 is depicted as extending perpendicularly from first body section bore 14. It is also to be understood that there may be a different angle between abutting surface 30 and bore 14.

Second body section 13 also has a radial abutting surface 32 (FIG. 2) and an axial abutting surface 33. The angles between these surfaces 32, 33 and between the surfaces and the second body section bore 15, may vary but will be positioned so as to be substantially conformable with abutting surfaces 30 and 31 of the first body section 12. When the two body sections are engaged in juxtaposition, the radial abutting surfaces 30 and 32 sealingly contact each other. Similarly, the two axial abutting surfaces 31 and 33 engage in sealing contact.

Seal ring 25 also has a first hose abutting surface 40 on the side opposite radial abutting surface 30, for engaging a leading edge 41a of hose 11a in bore 14. Hose abutting surface 40 preferably extends into first body section bore 14 to a distance sufficient to engage the entire leading edge 41a of hose 11a.

Similarly, the axial abutting surface 31 of first body section 12 extends into the second body section bore 15. The leading edge of axial abutting surface 31 is a second hose abutting surface 42 (FIGS. 1 and 3). Second hose abutting surface 42 extends into second body section bore 15 such that leading edge 41b of hose 11b fitted inside second body section bore 15 is engaged. Further, second hose abutting surface 42 is preferably dimensioned such that it extends radially inwardly of leading edge 41b of hose 11b.

A locking assembly is provided according to the present invention to securely and removably attach the first and second body sections 12 and 13 in juxtaposition, as described hereinabove. One embodiment of the locking assembly, shown in the drawings, consists of screw threads 43 on the proximal end 20 of the first body section 12. A nut 44 having a flange member 45 threadably engages screw threads 43. The second body section 13 is provided with a shoulder 46 (FIG. 3). Nut flange member 45 radially abuttingly engages second body section shoulder 46. Thus, when nut 44 is threadably engaged with screw threads 43 and abuttingly engaged with second body section shoulder 46, the first and second body sections 12 and 13 are locked in juxtaposition as described above. Further, by unscrewing the nut 44 from screw threads 43, the two body sections 12 and 13 are detached.

Thus it is to be appreciated, that the present invention provides a plurality sealing of contacts so as to make the engagement between the first and second body sections 12 and 13 fluid tight. These sealing contacts include that between the radial abutting surfaces 30 and 32, that between the axial abutting surfaces 31 and 33, the contact between hose leading edge 41a and first hose abutting surface 40, the contact between second hose leading edge 41b and second hose abutting surface 42, and finally, the locking means nut 44 engaging screw threads 43 and second body section shoulder 46. Should any one of the sealing engagements be breached, the remaining sealing engagement would still be sufficient to prevent escape of the stream flowing within hoses 11a and 11b.

It is further the accomplishment of this invention that no leading edges of hoses 11a or 11b are in a position to receive direct impingement from the fluid flow. This is important in that the present invention has applicability to sand blasting operations and the like, wherein high pressure air flows having entrained particulate matter are encountered. Hose leading edges subjected to such a high velocity particulate matter flow are soon destroyed, leading to seal integrity failure. This is the situation often encountered with hose coupling devices having washers or grommets.

The inside of the first and second body section bores 14 and 15 may be configured with gripping projections 50, which are shown in FIG. 1 as being a continuous spiral along the length of the bores. The gripping projections 50 serve to grip by friction the outside of hoses 11a and 11b. The gripping projections 50 more securely hold the hoses 11a and 11b inside the bores 14 and 15, respectively.

To even further secure the hoses 11a and 11b inside first and second body sections 12 and 13, respectively, these sections may also be provided with apertures 51, which extend through the body sections and open into the bores 14 and 15. A screw 52 may be inserted through aperture 51 and be caused to penetrate the hoses 11a or 11b (see FIG. 3). Preferably, the screw 52 will not completely radially penetrate the hoses 11a or 11b, but will only penetrate the outside surface.

The present invention is particularly adapted to operations where hoses of differing diameters are coupled. For instance, in high pressure sand blasting operations, a length of hose of a larger diameter is placed closest to the air compressor. Subsequent lengths of hose may have a somewhat smaller diameter, and so forth to the end nozzle. This configuration of hoses takes advantage of a venturi effect, thereby increasing the flow rate of the particulate matter leaving the hose.

One configuration of the present invention which will accomplish the coupling of hoses having differing diameters is shown in the drawings. The outside diameter of nut 44 and screw threads 43 will remain the same independent of the diameter of the hoses 11a or 11b to be coupled. Similarly, the abutting surfaces 30, 31, 32 and 33 will have the same dimensions regardless of the diameter of hoses 11a or 11b. However, the inside diameters of the first and second body section bores 14 and 15 may vary according to the diameter of hoses 11a or 11b. Thus, it is to be appreciated, that a hose having a particular diameter may be coupled to another hose having the same or a different diameter, without any modification to the sealing surfaces.

The nut 44 may be provided with an exterior sloping edge 53 at its side opposite that which threadably engages screw threads 43. Further, the first body section may be provided with a sloping protrusion 54 immediately distal to the screw threads 43. When first and second body sections 12 and 13 are engaged in juxtaposition, these sloping surfaces ensure that there is no acute corner along the length of the coupling 10. This is important in operations wherein the coupled hoses are to be dragged over the ground or through the framework of a bridge, scaffolding or the like. The obtuse configuration provided by nut sloping edge 53 and the sloping protrusion 54 reduces the possibility that the coupling 10 will become caught upon objects or framework, and allows the hoses to be freely dragged where an operator requires.

Further, when the hoses 11a and 11b are uncoupled, sloping protrusion 54 of first body section 12 in extending radially further outwardly protects screw threads 43 from damage when the hoses are pulled or dragged along the ground or over objects.

Thus, it should be evident that a coupling for high-pressure hoses embodying the concepts of the present invention as disclosed herein carries out the various objects of the invention and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. A device for coupling hoses in juxtaposition comprising:
    a first body section and a second body section;
    a cylindrical bore in each of said first and second body sections, such that a hose end may be fitted into each of said bores;
    said first and second body sections having engaging means therebetween;
    said engaging means including abutting surfaces on both of said first and second body sections;
    said abutting surfaces creating a fluid tight seal when said first and second body sections are engaged in juxtaposition;
    said engaging means of said first body section having a seal ring extending into said bore of said first body section to a distance sufficient to permit sealing engagement of a first hose abutting surface with the hose fitted within said bore of said first body section;
    said seal ring further extending into said bore of said second body section to a distance sufficient to permit sealing engagement of a second hose abutting surface with the hose fitted within said bore of said second body section, whereby said seal ring effects sealing engagement with said hose ends interiorly of the fluid tight seal between said abutting surfaces of said first and second body sections; and
    locking means to securely and selectively attach said first and said second body sections in juxtaposition.

2. A device as in claim 1, further comprising spiral ribs on the inside surfaces of said bores.

3. A device as in claim 1, including a plurality of apertures in said first and second body sections, and screw means inserted through said apertures to penetrate the surface of said hose ends and secure the hoses in each of said first and second body section bores.

4. A device as in claim 1, wherein the inside diameters of said first and second body sections are the same.

5. A device as in claim 1, wherein the inside diameters of said first and second body sections are different, such that hoses having different outside diameters may be coupled.

6. A device as in claim 1, wherein said seal ring has a radial abutting surface.

7. A device as in claim 6, wherein said second body section has a radial abutting surface whereby said radial abutting surface of said seal ring sealingly engages said radial abutting surface of said second body section when said first and second body sections are coupled in juxtaposition.

8. A device as in claim 1, wherein said seal ring has an axial abutting surface.

9. A device as in claim 8, wherein said second body section has an axial abutting surface whereby said axial abutting surface of said seal ring sealingly engages said axial abutting surface of said second body when said first and second body sections are coupled in juxtaposition.

10. A device as in claim 1, wherein said first and second hose abutting surfaces are substantially radially oriented.

11. A device as in claim 10, wherein said first and second hose abutting surfaces are of sufficient extent to engage substantially the entire leading edge of said hose end in each of said bores.

12. A device for coupling hoses in juxtaposition comprising:
    a first body section and a second body section;
    a cylindrical bore in each of said first and second body sections, such that a hose end may be fitted into each of said bores;
    said first and second body sections having engaging means therebetween;
    said engaging means including abutting surfaces on both of said first and second body sections;
    said abutting surfaces creating a fluid tight seal when said first and second body sections are engaged in juxtaposition;
    said engaging means of said first body section having a seal ring extending into said bore of said first body section to a distance sufficient to permit sealing engagement with the hose fitted within said first body section;
    said seal ring further extending into said bore of said second body section to a distance sufficient to permit sealing engagement with the hose fitted within said second body section; and
    locking means to securely and selectively attach said first and said second body sections in juxtaposition, said locking means including screw threads on the outside of said first body section and including a nut associated with said second body section having threads engageable with said screw threads of said first body section.

13. A device as in claim 12, wherein said locking means further includes a shoulder on the outside of said second body section.

14. A device as in claim 13, wherein said nut has a circumferential flange extending toward the radial center of said nut, such that said flange is engageable with said shoulder of said second body section.

15. A device for coupling hoses in juxtaposition comprising:
   a first body section and a second body section;
   a cylindrical bore in each of said first and second body sections, such that a hose end may be fitted into each of said bores;
   said first and second body sections having engaging means therebetween;
   said engaging means including abutting surfaces on both of said first and second body sections; said abutting surfaces creating a fluid tight seal when said first and second body sections are engaged in juxtaposition;
   said engaging means of said first body section having a seal ring extending into said bore of said first body section to a distance sufficient to permit sealing engagement with the hose fitted within said first body section;
   said seal ring further extending into said bore of said second body section to a distance sufficient to permit sealing engagement with the hose fitted within said second body section; and
   locking means to securely and selectively attach said first and said second body, sections in juxtaposition, said locking means including a nut which with said first body section have sloped outer surfaces, such that coupled hoses may be dragged without snagging on surrounding objects.

* * * * *